US012621403B2

(12) United States Patent
Benlahrech et al.

(10) Patent No.: US 12,621,403 B2
(45) Date of Patent: May 5, 2026

(54) METHODS FOR RACKING A CAMERA BAR, AND RELATED METHODS, SYSTEMS AND COMPUTER PROGRAM PRODUCTS

(71) Applicant: NCAM TECHNOLOGIES LIMITED, London (GB)

(72) Inventors: Gabriel Benlahrech, London (GB); Michael Goldman, London (GB); Brice Michoud, London (GB)

(73) Assignee: CARL ZEISS AG, Oberkochen (DE)

( * ) Notice: Subject to any disclaimer, the term of this patent is extended or adjusted under 35 U.S.C. 154(b) by 145 days.

(21) Appl. No.: 18/560,490

(22) PCT Filed: May 12, 2022

(86) PCT No.: PCT/GB2022/051208
§ 371 (c)(1),
(2) Date: Nov. 13, 2023

(87) PCT Pub. No.: WO2022/238708
PCT Pub. Date: Nov. 17, 2022

(65) Prior Publication Data
US 2024/0259515 A1 Aug. 1, 2024

(30) Foreign Application Priority Data

May 12, 2021 (GB) ..................................... 2106752

(51) Int. Cl.
*H04N 5/222* (2006.01)
*G06T 7/73* (2017.01)
(Continued)

(52) U.S. Cl.
CPC ............. *H04N 5/2224* (2013.01); *G06T 7/73* (2017.01); *G06T 19/006* (2013.01);
(Continued)

(58) Field of Classification Search
CPC .... H04N 13/156; H04N 23/633; H04N 23/90; H04N 5/2224; H04N 5/272;
(Continued)

(56) References Cited

U.S. PATENT DOCUMENTS

| | | | |
|---|---|---|---|
| 10,929,670 B1* | 2/2021 | Troy ....................... | G06V 20/20 |
| 2007/0248283 A1* | 10/2007 | Mack ..................... | H04N 5/222 |
| | | | 348/E5.022 |

(Continued)

OTHER PUBLICATIONS

International Search Report, dated Nov. 7, 2022 issued in priority International Application No. PCT/GB2022/051208.

*Primary Examiner* — Thai Q Tran
*Assistant Examiner* — Stephen R Smith
(74) *Attorney, Agent, or Firm* — Saul Ewing LLP

(57) ABSTRACT

A method of setting up non-randomly positioned markers in a field of view of a camera bar, and tracking a pose of the camera bar, including: (i) a camera bar of a video camera viewing a field of view; (ii) displaying the camera bar's view on a display; (iii) the computer system: generating a pattern of non-random marker positions, and displaying them with the camera bar's view; (iv) detecting that a marker has been placed in a position of a non-random marker position; (v) recording a marker and a respective position of the marker; (vi) repeating steps (iv) and (v) until a predetermined number of different markers and respective marker positions have been recorded; (vii) matching markers detected with the recorded markers and their respective marker positions, to obtain a pose of the camera bar; (viii) repeating step (vii), to track the pose of the camera bar.

30 Claims, 6 Drawing Sheets

(51) Int. Cl.

| | |
|---|---|
| *G06T 19/00* | (2011.01) |
| *H04N 13/156* | (2018.01) |
| *H04N 23/63* | (2023.01) |
| *H04N 23/90* | (2023.01) |

(52) U.S. Cl.
CPC ......... *H04N 13/156* (2018.05); *H04N 23/633* (2023.01); *H04N 23/90* (2023.01); *G06T 2207/30244* (2013.01)

(58) Field of Classification Search
CPC ...... H04N 13/261; H04N 21/816; G06T 7/73; G06T 19/006; G06T 2207/30244
USPC .......................................... 348/169; 345/419
See application file for complete search history.

(56) References Cited

U.S. PATENT DOCUMENTS

| | | | |
|---|---|---|---|
| 2010/0168562 A1 | 7/2010 | Zhao et al. | |
| 2017/0191822 A1* | 7/2017 | Becker ...................... | G06T 7/33 |
| 2019/0014310 A1* | 1/2019 | Bradski ................. | H04N 23/60 |
| 2020/0305827 A1 | 10/2020 | Boll et al. | |
| 2020/0364900 A1* | 11/2020 | Bradski ................. | H04N 23/80 |
| 2020/0410765 A1 | 12/2020 | Geissler et al. | |
| 2021/0125352 A1* | 4/2021 | Mirza .................... | G06T 7/292 |
| 2021/0350575 A1* | 11/2021 | Tang ....................... | G06T 7/73 |
| 2022/0201163 A1* | 6/2022 | Ukas-Bradley ...... | H04N 5/2628 |

* cited by examiner

METHODS FOR RACKING A CAMERA BAR, AND RELATED METHODS, SYSTEMS AND COMPUTER PROGRAM PRODUCTS

CROSS-REFERENCE TO RELATED APPLICATIONS

This application claims the priority of International Application No. PCT/GB2022/051208 filed May 12, 2022, which claims priority to GB Application No. 2106752.5, filed May 12, 2021, the entire contents of which being fully incorporated herein by reference.

BACKGROUND OF THE INVENTION

1. Field of the Invention

The field of the invention relates to methods of tracking a camera bar, or of tracking a video camera including a camera bar, and to related methods, systems, computer program products, video files, and video streams.

2. Technical Background

When using a system for producing a virtual scene combining live video enhanced by other imagery, such as computer generated imagery, users want to be able to set the system up quickly, because studio time is expensive. It is also desirable to reduce energy consumption of a such a system, because video processing tends to use significant amounts of energy. Users also prefer to be able to view the virtual scene combining live video enhanced by other imagery, such as computer generated imagery, in real-time.

3. Discussion of Related Art

US20070248283(A1) discloses a system for producing a virtual scene combining live video enhanced by other imagery, including computer generated imagery. In one embodiment it includes a scene camera with an attached tracking camera, the tracking camera viewing a tracking marker pattern, which has a plurality of tracking markers with identifying indicia. The tracking marker pattern is positioned proximate so that when viewed by the tracking camera, the coordinate position of the scene camera can be determined in real time. The disclosure also includes filtering algorithms, that vary based on camera motion and maintain accurate positioning. It is disclosed that alternative embodiments could include a randomly distributed array of markers, and markers of various sizes and orientations.

SUMMARY OF THE INVENTION

According to a first aspect of the invention, there is provided a method of setting up non-randomly positioned markers in a field of view of a camera bar, and tracking a pose of the camera bar, the method including the steps of:
- (i) a camera bar viewing a field of view, the camera bar in fixed attachment with a video camera;
- (ii) displaying the camera bar's view of the field of view on a display of a computer system;
- (iii) the computer system generating a pattern of non-random marker positions, including positions in the field of view, and displaying the pattern of non-random marker positions in the field of view on the display of the computer system together with the camera bar's view of the field of view;

- (iv) the computer system detecting in the view of the camera bar, that a marker has been placed in a position of a non-random marker position, generated in step (iii);
- (v) the computer system recording a marker and a respective position of the marker in the field of view, in response to the computer system detecting in the view of the camera bar, that a marker has been placed in a position of a non-random marker position, in step (iv);
- (vi) repeating steps (iv) and (v) until a predetermined number of different markers and respective marker positions have been recorded;
- (vii) the computer system matching markers detected in the field of view of the camera bar with the recorded markers and their respective marker positions, to obtain a pose of the camera bar;
- (viii) repeating step (vii), to track the pose of the camera bar.

The generated pattern of non-random marker positions may include positions outside an initial field of view of the camera bar.

An advantage is that the non-randomly positioned markers in a field of view of a camera bar can be set up quickly by just one person who can place the markers while viewing the display, while the computer system detects when the person has placed the marker in a non-random marker position. An advantage is that the pose of the camera bar can be tracked using less energy, because matching the markers detected in the field of view of the camera bar with the recorded markers and their respective non-randomly positioned marker positions is computationally efficient, because the non-randomly positioned marker positions are highly distinct, which reduces the energy requirements for the computation. An advantage is that the pose of the camera bar can be tracked in real-time, because matching the markers detected in the field of view of the camera bar with the recorded markers and their respective non-randomly positioned marker positions is computationally efficient, because the non-randomly positioned marker positions are highly distinct, which reduces the time requirements for the computation.

The camera bar and the computer system may be connected by a data cable, or they may be connected by a wireless data connection.

The method may be one including the step of storing the recorded predetermined number of different markers and respective marker positions.

The method may be one wherein the generated pattern of non-random marker positions in the field of view starts from an initial indicator which is detected in the field of view by the computer system. An advantage is that the set up process may be speeded up, because it starts from a preselected point, which may be selected for speeding up the set up.

The method may be one wherein the generated pattern of non-random marker positions in the field of view is generated using a path represented by a continuously differentiable (C1) continuous path or function. An advantage is that the pose of the camera bar can be tracked using less energy, because the non-randomly positioned marker positions are highly distinct, which reduces the energy requirements for the tracking computation.

The method may be one wherein the generated pattern of non-random marker positions in the field of view is generated using a path represented by a smooth continuous path or function. An advantage is that the pose of the camera bar can be tracked using less energy, because the non-randomly positioned marker positions are highly distinct, which reduces the energy requirements for the tracking computation.

The method may be one wherein the markers positions are equidistantly spaced along the path.

The method may be one wherein the generated pattern of non-random marker positions in the field of view is generated from a set of parameters which are passed into one or more well-defined, deterministic formulas.

The method may be one wherein a formula generates a spiral pattern and the parameters include the position of an initial marker, the camera bar height above the floor and the orientation angle(s) of the camera bar. An advantage is that a spiral pattern is provided which is well-customized to a particular environment, which can speed up set up time.

The method may be one wherein the generated pattern of non-random marker positions in the field of view is a spiral pattern. An advantage is that the pose of the camera bar can be tracked using less energy, because the non-randomly positioned marker positions are highly distinct, which reduces the energy requirements for the tracking computation.

The method may be one wherein the generated pattern of non-random marker positions in the field of view is a quasicrystal pattern. An advantage is that the pose of the camera bar can be tracked using less energy, because the non-randomly positioned marker positions are highly distinct, which reduces the energy requirements for the tracking computation.

The method may be one wherein the generated pattern of non-random marker positions in the field of view is on a non-periodic grid, or on a periodic grid, or is on a non-periodic lattice, or is on a periodic lattice. An advantage is that the pose of the camera bar can be tracked using less energy, because the non-randomly positioned marker positions are highly distinct, which reduces the energy requirements for the tracking computation.

The method may be one wherein the generated pattern of non-random marker positions in the field of view is on a set of non-intersecting closed curves, e.g. on a set of concentric circles. An advantage is that the pose of the camera bar can be tracked using less energy, because the non-randomly positioned marker positions are highly distinct, which reduces the energy requirements for the tracking computation.

The method may be one wherein the generated pattern of non-random marker positions in the field of view is on a set of non-intersecting open curves, e.g. on a set of concentric semicircles. An advantage is that the pose of the camera bar can be tracked using less energy, because the non-randomly positioned marker positions are highly distinct, which reduces the energy requirements for the tracking computation.

The method may be one wherein in step (iii), the pattern of non-random marker positions in the field of view are overlaid on the camera bar's view of the field of view.

The method may be one wherein in step (iv), the computer system displays in the display that it has detected in the view of the camera bar that a marker has been placed in a position of a non-random marker position, e.g. by changing a displayed colour of the non-random marker position, e.g. from red to green.

The method may be one wherein the camera bar is a monoscopic camera bar.

The method may be one wherein step (vii) includes
(a) detecting markers' 2D positions in a sequence of images viewed by the camera bar using a marker extraction algorithm, where the first image and the last image of the sequence are taken from different camera bar positions, and labelling markers through the sequence using nearest neighbour matching;

(b) extracting matrices using a robust extractor to extract rotation and translation, in which a scale factor is unknown, from the first frame of the sequence to the last frame of the sequence;

(c) computing 3D marker positions, in which the scale factor is unknown, using the detected 2D marker positions, using camera bar calibration data;

(d1) matching the computed 3D marker scaled positions to a 3D path of the markers, where the 3D path in a world coordinate system is known, including fitting the set of computed 3D marker positions to the 3D path of the markers, including deriving the scale factor; or (d2) matching the computed 3D marker scaled positions to the 3D positions of the markers, where the 3D positions of the markers in a world coordinate system are known, including fitting the set of computed 3D marker positions to the 3D positions of the markers, including deriving the scale factor;

(e) modelling the matching solution as a SIM(3) of the Lie Group, to represent camera bar pose, the matching solution including a scale, and (f) extracting the camera bar pose from the matching solution, in the world coordinate system. An advantage is that a simple camera bar, a monoscopic camera bar, can be used.

The method may be one wherein steps (d1) or (d2) are performed by using iterative closest point (ICP) fitting, or curve fitting or using a non-linear minimization technique such as a Levenberg-Marquardt algorithm (LMA or just LM); or using a Gauss Newton algorithm.

The method may be one wherein in step (b), Random sample consensus, RANSAC, is used.

The method may be one wherein the Camera bar is a stereoscopic camera bar, including two cameras mounted a fixed distance apart in a stereoscopic configuration. An advantage is that the pose of the camera bar can be tracked using less energy, because the non-randomly positioned marker positions are determined quickly and accurately, which reduces the energy requirements for the tracking computation.

The method may be one wherein the camera bar includes three cameras, arranged in a triangle (e.g. an equilateral triangle), at fixed distances from each other. An advantage is that the pose of the camera bar can be tracked using less energy, because the non-randomly positioned marker positions are determined quickly and accurately, which reduces the energy requirements for the tracking computation.

The method may be one wherein the camera bar includes a plurality of cameras. An advantage is that the pose of the camera bar can be tracked using less energy, because the non-randomly positioned marker positions are determined quickly and accurately, which reduces the energy requirements for the tracking computation.

The method may be one wherein step (vii) includes:
(a) detecting markers' 2D positions on images viewed by the camera bar using a marker extraction algorithm;

(b) computing 3D marker positions using the detected 2D marker positions, using camera bar calibration data, and using a camera bar coordinate system;

(c1) matching the computed 3D marker positions to a 3D path of the markers, where the 3D path in a world coordinate system is known, including fitting the set of computed 3D marker positions to the 3D path of the markers; or (c2) matching the computed 3D marker positions to the 3D positions of the markers, where the 3D positions of the markers in a world coordinate system are known, including fitting the set of computed 3D marker positions to the 3D positions of the markers;

(d) modelling the matching solution as a SE(3) of the Lie Group, to represent camera bar pose, and (e) extracting the camera bar pose from the matching solution, in the world coordinate system. An advantage is that the pose of the camera bar can be tracked using less energy, because the non-randomly positioned marker positions are determined quickly and accurately, which reduces the energy requirements for the tracking computation.

The method may be one wherein steps (c1) or (c2) are performed by using Iterative closest point (ICP) fitting, or curve fitting or using a non-linear minimization technique such as a Levenberg-Marquardt algorithm (LMA or just LM); or using a Gauss Newton algorithm.

The method may be one wherein the camera bar pose is provided instantaneously.

The method may be one in which the field of view of the camera bar does not coincide at all with the field of view of the video camera. An advantage is that the markers do not appear in the video recorded by the video camera.

The method may be one in which the field of view of the camera bar partially overlaps with the field of view of the video camera. An advantage is that some markers do not appear in the video recorded by the video camera.

The method may be one in which the field of view of the camera bar includes the whole of the field of view of the video camera. An advantage is improved camera bar tracking accuracy.

The method may be one in which the markers have specific shapes, and/or colours and/or are made of specific materials.

The method may be one in which the markers used do not differ from each other significantly in appearance. An advantage is that the non-randomly positioned markers in a field of view of a camera bar can be set up quickly, because there is no accidental mixing up of different markers.

The method may be one in which the markers used are approximately spherical, or approximately circular. An advantage is that the non-randomly positioned markers in a field of view of a camera bar can be set up quickly, because there is no orientational error for the markers.

The method may be one in which the camera bar pose comprises camera bar rotation and camera bar translation i.e. six degrees of freedom. An advantage is accurate tracking of the camera bar.

The method may be one in which the computer system is a laptop computer, a desktop computer, a tablet computer, or a smartphone.

The method may be one in which the camera bar is moved to display a new field of view partly overlapping with a previous field of view, after the camera pose is tracked for the first time, and then the pattern of non-random marker positions in the new field of view is displayed on the display of the computer system together with the camera bar's view of the new field of view, and then steps (iv) and (v) are performed. An advantage is that camera pose tracking can be provided for fields of view outside the previous field of view.

The method may be one including repeating steps (iv) and (v), together with performing step (viii). An advantage is that further non-randomly positioned markers can be added, to improve the tracking of the camera bar.

The method may be one including, when performing step (viii), the number of different markers and respective marker positions that have been recorded is at least ten, or is in the range of 10 to 1000, or is in the range of 20 to 500. An advantage is improved the tracking of the camera bar, without requiring an excessively long set up time.

According to a second aspect of the invention, there is provided a system including a video camera, a camera bar in fixed attachment with the video camera, and a computer system including a display, wherein the computer system is configured to:

(i) display the camera bar's view of a field of view on the display of the computer system;

(ii) generate a pattern of non-random marker positions, including positions in the field of view, and display the pattern of non-random marker positions in the field of view on the display of the computer system together with the camera bar's view of the field of view;

(iii) detect in the view of the camera bar, that a marker has been placed in a position of a non-random marker position, generated in (ii);

(iv) record a marker and a respective position of the marker in the field of view, in response to detecting in the view of the camera bar, that a marker has been placed in a position of a non-random marker position, in (iii);

(v) repeat (iii) and (iv) until a predetermined number of different markers and respective marker positions have been recorded;

(vi) match markers detected in the field of view of the camera bar with the recorded markers and their respective marker positions, to obtain a pose of the camera bar;

(vii) repeat (vi), to track the pose of the camera bar.

An advantage is that the non-randomly positioned markers in a field of view of a camera bar can be set up quickly by just one person who can place the markers while viewing the display, while the computer system detects when the person has placed the marker in a non-random marker position. An advantage is that the pose of the camera bar can be tracked using less energy, because matching the markers detected in the field of view of the camera bar with the recorded markers and their respective non-randomly positioned marker positions is computationally efficient, because the non-randomly positioned marker positions are highly distinct, which reduces the energy requirements for the computation. An advantage is that the pose of the camera bar can be tracked in real-time, because matching the markers detected in the field of view of the camera bar with the recorded markers and their respective non-randomly positioned marker positions is computationally efficient, because the non-randomly positioned marker positions are highly distinct, which reduces the time requirements for the computation.

The system may be one configured to perform a method of any aspect of the first aspect of the invention.

According to a third aspect of the invention, there is provided a computer program product, the computer program product executable on a computer system including a display to:

(i) display a camera bar's view of a field of view on the display of the computer system;

(ii) generate a pattern of non-random marker positions, including positions in the field of view, and display the pattern of non-random marker positions in the field of view on the display of the computer system together with the camera bar's view of the field of view;

(iii) detect in the view of the camera bar, that a marker has been placed in a position of a non-random marker position, generated in (ii);

(iv) record a marker and a respective position of the marker in the field of view, in response to detecting in the view of the camera bar, that a marker has been placed in a position of a non-random marker position, in (iii);

(v) repeat (iii) and (iv) until a predetermined number of different markers and respective marker positions have been recorded;

(vi) match markers detected in the field of view of the camera bar with the recorded markers and their respective marker positions, to obtain a pose of the camera bar;

(vii) repeat (vi), to track the pose of the camera bar.

An advantage is that the non-randomly positioned markers in a field of view of a camera bar can be set up quickly by just one person who can place the markers while viewing the display, while the computer system detects when the person has placed the marker in a non-random marker position. An advantage is that the pose of the camera bar can be tracked using less energy, because matching the markers detected in the field of view of the camera bar with the recorded markers and their respective non-randomly positioned marker positions is computationally efficient, because the non-randomly positioned marker positions are highly distinct, which reduces the energy requirements for the computation. An advantage is that the pose of the camera bar can be tracked in real-time, because matching the markers detected in the field of view of the camera bar with the recorded markers and their respective non-randomly positioned marker positions is computationally efficient, because the non-randomly positioned marker positions are highly distinct, which reduces the time requirements for the computation.

The computer program product may be executable on the computer system to perform a method of any aspect of the first aspect of the invention.

According to a fourth aspect of the invention, there is provided a method for mixing or compositing computer generated 3D objects and a video feed from a video camera, to generate augmented reality video in real-time, in which:

(a) the body of the video camera can be moved in 3D and sensors, including an accelerometer and a gyro sensing over six degrees of freedom, in or attached directly or indirectly to the video camera provide real-time positioning data enabling the 3D position and 3D orientation of the video camera to be calculated;

(b) a camera bar, for example including two cameras forming a stereoscopic system, is fixed directly or indirectly to the video camera;

(c) that real-time positioning data is then automatically used to create, recall, render or modify computer generated 3D objects;

(d) the resulting computer generated 3D objects are then mixed in or composited with the video feed from the video camera in real-time to provide augmented reality video for example for TV broadcast, cinema or video games;

and in which:

(e) the 3D position and orientation of the video camera is determined with reference to a 3D map of the real-world, by using the real-time 3D positioning data from the sensors plus a video flow in which the camera bar, for example including two cameras forming a stereoscopic system, surveys a field of view, and software running on a processor is used to detect non-randomly positioned markers in the field of view, the markers and their non-random positions being previously recorded at the processor and included in the 3D map of the real-world, wherein the markers have been previously manually or artificially added to that field of view.

An advantage is that the pose of the video camera can be tracked using less energy, because matching the markers detected in the field of view of the camera bar with the recorded markers and their respective non-randomly positioned marker positions is computationally efficient, because the non-randomly positioned marker positions are highly distinct, which reduces the energy requirements for the computation. An advantage is that the pose of the video camera can be tracked in real-time, because matching the markers detected in the field of view of the camera bar with the recorded markers and their respective non-randomly positioned marker positions is computationally efficient, because the non-randomly positioned marker positions are highly distinct, which reduces the time requirements for the computation.

The method may be one including a method of any aspect of the first aspect of the invention.

According to a fifth aspect of the invention, there is provided a mixing or compositing system, the mixing or compositing system including:

(i) a video camera;

(ii) sensors including an accelerometer and a gyro sensing over six degrees of freedom;

(iii) a camera bar, for example including two cameras forming a stereoscopic system; and (iv) a processor;

for mixing or compositing computer generated 3D objects and a video feed from the video camera in real-time, to generate augmented reality video in real-time for example for TV broadcast, cinema or video games, in which:

(a) the body of the video camera can be moved in 3D and the sensors in or attached directly or indirectly to the video camera provide real-time positioning data enabling the 3D position and 3D orientation of the video camera to be calculated;

(b) the camera bar, for example including two cameras forming a stereoscopic system, is fixed directly or indirectly to the video camera;

(c) the system is configured to use that real-time positioning data automatically to create, recall, render or modify computer generated 3D objects;

(d) the system is configured to mix in or to composite the resulting computer generated 3D objects with the video feed from the video camera in real-time to provide augmented reality video in real-time for example for TV broadcast, cinema or video games;

and in which:

(e) the system is configured to determine the 3D position and orientation of the video camera with reference to a 3D map of the real-world, by using the real-time 3D positioning data from the sensors plus a video flow in which the camera bar, for example including two cameras forming a stereoscopic system, surveys a field of view, and in which software running on the processor is configured to detect non-randomly positioned markers in the field of view, the markers and their non-random positions being previously recorded at the processor and included in the 3D map of the real-world, wherein the markers have been previously manually or artificially added to that field of view.

An advantage is that the pose of the video camera can be tracked using less energy, because matching the markers detected in the field of view of the camera bar with the recorded markers and their respective non-randomly positioned marker positions is computationally efficient, because the non-randomly positioned marker positions are highly distinct, which reduces the energy requirements for the computation. An advantage is that the pose of the video camera can be tracked in real-time, because matching the markers detected in the field of view of the camera bar with the recorded markers and their respective non-randomly positioned marker positions is computationally efficient, because the non-randomly positioned marker positions are highly distinct, which reduces the time requirements for computation.

The system may be one including a system of any aspect of the second aspect of the invention.

According to a sixth aspect of the invention, there is provided a video file of a video produced using a method of any aspect of the fourth aspect of the invention.

According to a seventh aspect of the invention, there is provided a video stream of a video produced using a method of any aspect of the fourth aspect of the invention.

Aspects of the invention may be combined.

BRIEF DESCRIPTION OF THE FIGURES

Aspects of the invention will now be described, by way of example(s), with reference to the following Figures, in which.

DETAILED DESCRIPTION

Figure 1:
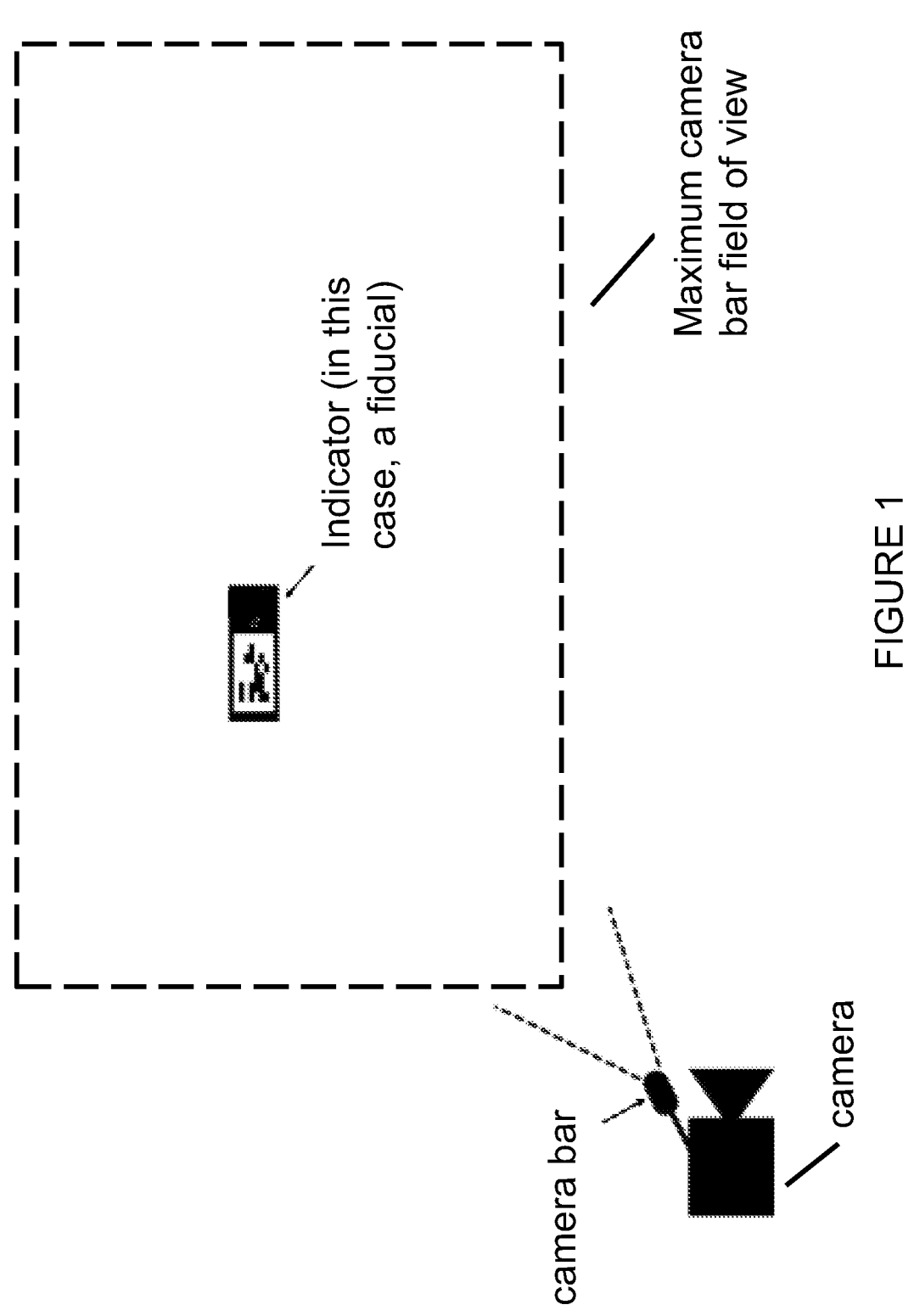
FIG. 1 shows an example of a camera bar viewing a field of view, the field of view including an indicator.

Setting Up and Tracking Non-Randomly Positioned Markers

Overview

When producing video media (e.g. a video file, or real-time video) in which video of the real world is mixed with virtual objects, for example producing virtual 3D objects (e.g. props) a news presenter can walk around in a news programme or in a news segment, or for example adding in a computer-generated monster into a video of a movie set, there is a need to track the position of the real-world camera as the real-world camera moves, so the graphics can be added in realistically. In an example, we use a stereo-vision camera bar which is in fixed attachment to the real-world camera, in which the camera bar includes two cameras mounted a fixed distance apart in a stereoscopic configuration, to track the position of the real-world camera that the camera bar is attached to, and the camera bar may be used to detect previously recorded non-randomly positioned markers in the camera bar field of view to infer camera bar position. The field of view of the camera bar may not coincide at all with the field of view of the real-world camera. The field of view of the camera bar may partially overlap with the field of view of the real-world camera. The field of view of the camera bar may include the whole of the field of view of the real-world camera. In an example, we use Synthetic Markers added intentionally in the 3D space viewable from the camera bar, such that the Synthetic Markers can be seen in the camera bar's working space (e.g. in the camera bar's maximum field of view). The Synthetic Markers may have specific shapes, and/or colours and/or be made of specific materials, to aid their detection in an image. In this document we will refer to them as Markers. In an example, the markers used do not differ from each other significantly in appearance. In an example, the markers used are approximately spherical. In an example, the markers are distributed on a spiral. In an example, the markers are distributed on a quasicrystal lattice. In an example, the markers are distributed on a non-periodic grid, or on a periodic grid, or on a non-periodic lattice, or on a periodic lattice. In an example, the markers are distributed on a set of non-intersecting closed curves, e.g. on a set of concentric circles. A closed curve is a curve where the beginning and end points are the same. In an example, the markers are distributed on a set of non-intersecting open curves, e.g. on a set of concentric semicircles. An open curve is a curve where the beginning and end points are different.

In this document, we describe a method and system for tracking camera pose (camera pose typically comprises camera Rotation and camera Translation i.e. six degrees of freedom) using a non-random arrangement of Markers, in which the markers are viewable by the camera bar. The Markers are placed intentionally into non-random, pre-defined positions. In an example, such non-random, pre-defined positions are dictated by (e.g. Ncam) software executing on a computer that may provide clarity and simplicity for user setup, and may also provide predictability for the software computation that will result in improved tracking quality.

Setup

In an example setup, a user using a computer system attempts to track a single monocular camera, in which the camera includes an image sensor array and a lens, the lens arranged to focus image light onto the image sensor array. However we could also use the tracking setup with any number of cameras simultaneously, where the cameras are at a fixed relative position to each other. We call this arrangement of cameras, where the cameras are at a fixed relative position to each other, a Camera Bar, where the cameras of the camera bar are arranged to image the same, or a very similar, field of view. In an example of a camera bar, two cameras are arranged on a bar, at a fixed distance from each other, where the cameras are arranged to image the same, or a very similar, field of view. In an example of a camera bar, three cameras are arranged in a triangle (e.g. an equilateral triangle) on a support, at fixed distances from each other, where the cameras are arranged to image the same, or a very similar, field of view. In the simplest case, a camera bar comprises a single camera. In a less simple case, a camera bar comprises a plurality of cameras, at a fixed relative position to each other, where the cameras are arranged to image the same, or a very similar, field of view.

The setup of the Markers may include the three steps below.

Initial Marker Placement

In an example, the first step for the user is to point the camera(s) of a camera bar towards an area they want to decorate with Markers. Some part of this area should always (or nearly always) be clearly visible from the camera bar's region of movement during filming. The user then places an indicator (e.g. a fiducial Marker or a singular Marker) to indicate the start of the arrangement of the non-random arrangement of Markers. An example is shown in FIG. 1. A fiducial marker or fiducial is an object placed in the field of view of an imaging system that appears in the image produced, for use as a point of reference or a measure.

The (e.g. Ncam) software executing on a computer then generates the allowable positions of the Markers using the initial indicator, and displays the allowable positions of the Markers to the user in a camera bar field of view in a user interface displayed by a computer system including a display (e.g. a laptop computer, a desktop computer, a tablet computer, or on a smartphone) so the user can know where to place the Markers in the camera bar field of view.

Depending on the size of the area the user is filming in, the number of markers typically used will vary. For example, ranging from 20-50 Markers in the smallest spaces (roughly 5 m$^2$) to 200-500 Markers in much larger spaces (roughly 80 m$^2$).

Usually, the Camera Bar will only see a subset of these markers since the Camera Bar's field of view will rarely, if ever, have all markers in view simultaneously in the vast majority of scenarios. A well-defined pattern of markers improves the reliability of determining the Camera Bar's pose, as typically particular marker patterns can only be seen from a unique pose, or from a limited set of poses. This reduces the scope for possible ambiguity of the Camera Bar's pose, as inferred from the positions of the non-randomly arranged markers.

Pattern Generation

Figure 2:
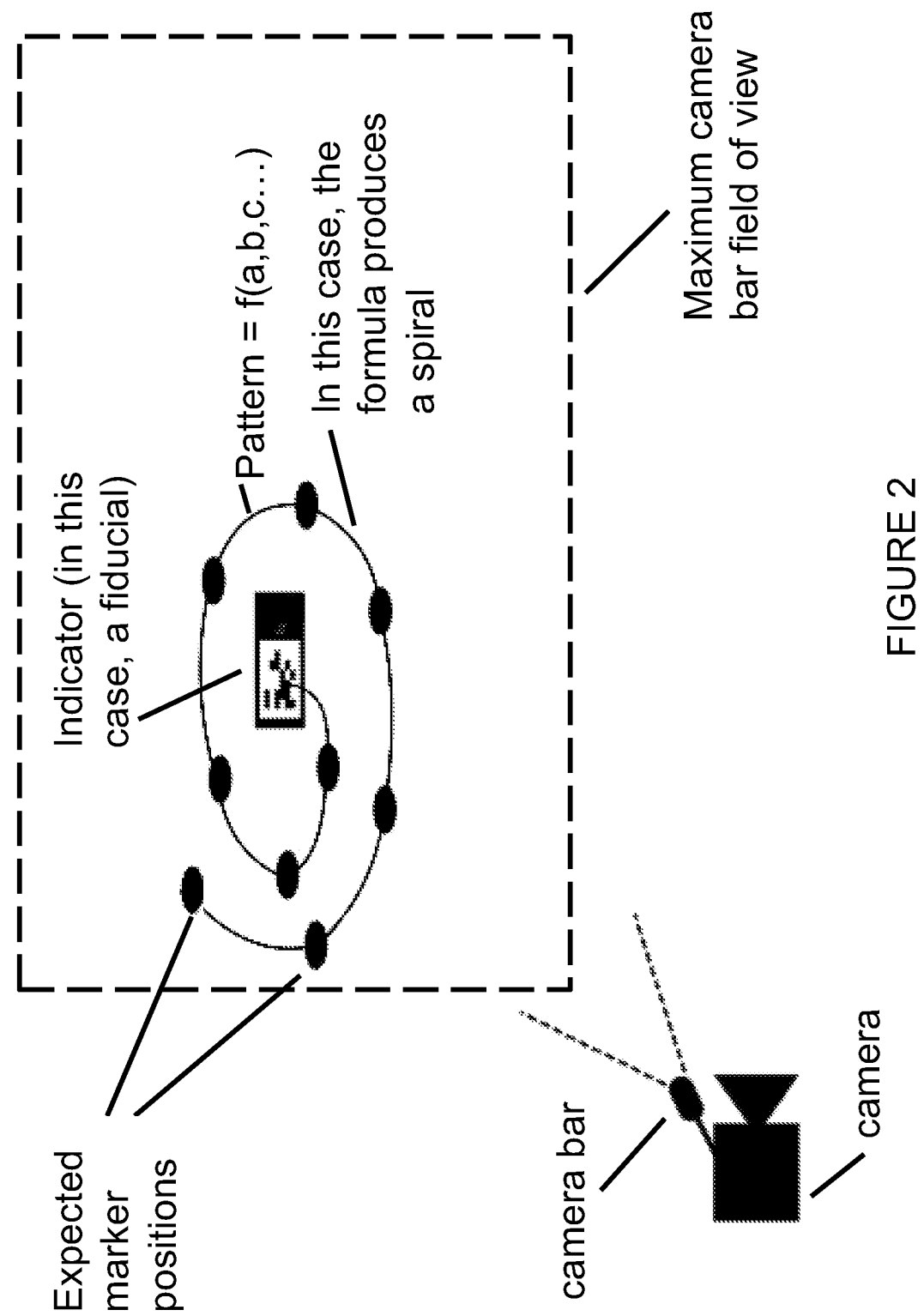
FIG. 2 shows an example of a camera bar viewing a field of view, the field of view including an indicator, in which a set of non-random marker positions is indicated, the set of non-random marker positions being on a spiral which starts from the indicator.

The non-random arrangement of markers may be generated from a set of parameters we can pass into one or more well-defined, deterministic formulas. For example, one such formula could generate a spiral pattern and the parameters used could include the position of an initial marker, the camera bar height above the floor in metres and the orientation(s) of the camera bar in degrees (e.g. tilt angle and azimuthal angle in a (e.g. spherical) coordinate system). An example is shown in FIG. 2.

In an example, the markers lie on a path that is represented by a continuously differentiable (C1) continuous path or function. In an example, the placement of the markers is non random provided the 3D path that intersects the markers' positions is a continuous, continuously differentiable (C1) path or function. In an example, the markers lie on a path that is represented by a smooth continuous path or function. In an example, the placement of the markers is non random provided the 3D path that intersects the markers' positions is a smooth continuous path or function. In an example, the markers positions are equidistantly spaced along the path.

Many formulas for a pattern of non-randomly positioned markers are possible here, however some patterns will work better than others. What defines an effective pattern will mostly come down to the following factors:

The uniformity of distribution of Markers that can be observed from the area the camera is moved in. This is to ensure the camera bar never views an area without markers and thus does not lose its position.

The uniqueness of the pattern within the field of view of the camera bar. This allows the tracking software executing on a computer to determine quickly its position from a position in which the markers are newly identified ("a cold start") because the pattern of markers in view is only possible from one viewpoint, or from a limited number of viewpoints.

The number of Markers in view at any one time. The higher the number of markers in view the more robust the tracking will be. However, too many markers in view will mean an increased setup time. Hence a pattern that uses a reasonable number density of markers is desirable.

Another pattern of non-randomly positioned markers that may satisfy the requirements well is a pattern of a quasicrystal, which is a pattern that is ordered but not periodic.

Figure 3:
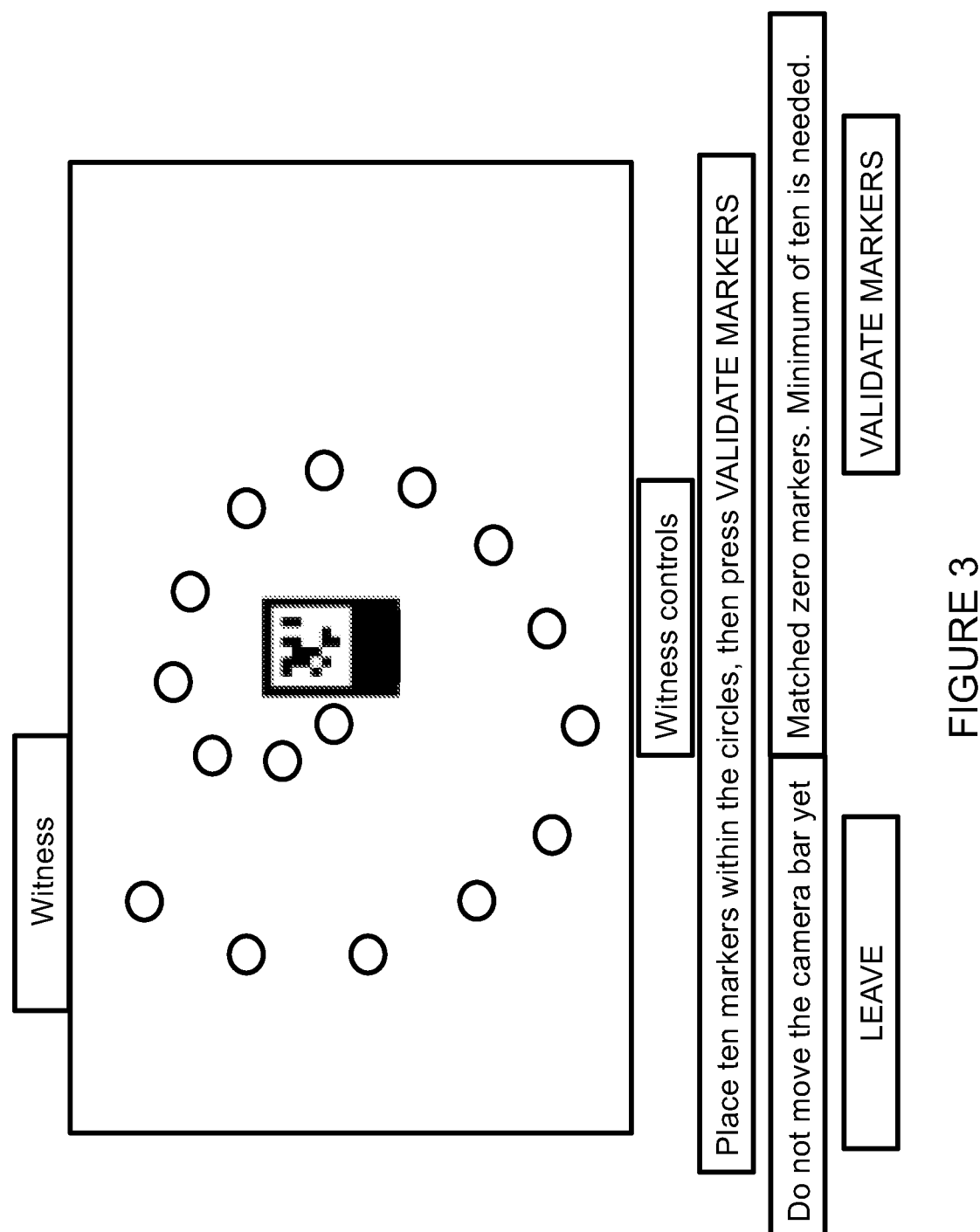
FIG. 3 shows an example user interface presented in a display of a computer system when a non-random spiral pattern is first generated, where the camera bar is pointed at the elements of the non-random pattern and the display shows a live video stream including the elements of the non-random pattern. The elements of the non-random pattern are overlaid on top of the video stream to guide the user.

The user interface presented in a display of a computer system may look like the image in FIG. 3 when a non-random spiral pattern is first generated, where the camera bar is pointed at the elements of the non-random pattern and the user views a live video stream including the elements of the non-random pattern. The elements of the non-random pattern (e.g. as red circles) are overlaid on top of the video stream to guide the user. (Note: the camera bar stereo cameras are referred to as "witness" cameras in the user interface (UI) of FIG. 3). In the example of FIG. 3, an initial marker is shown at the centre of the image.

Figure 5:
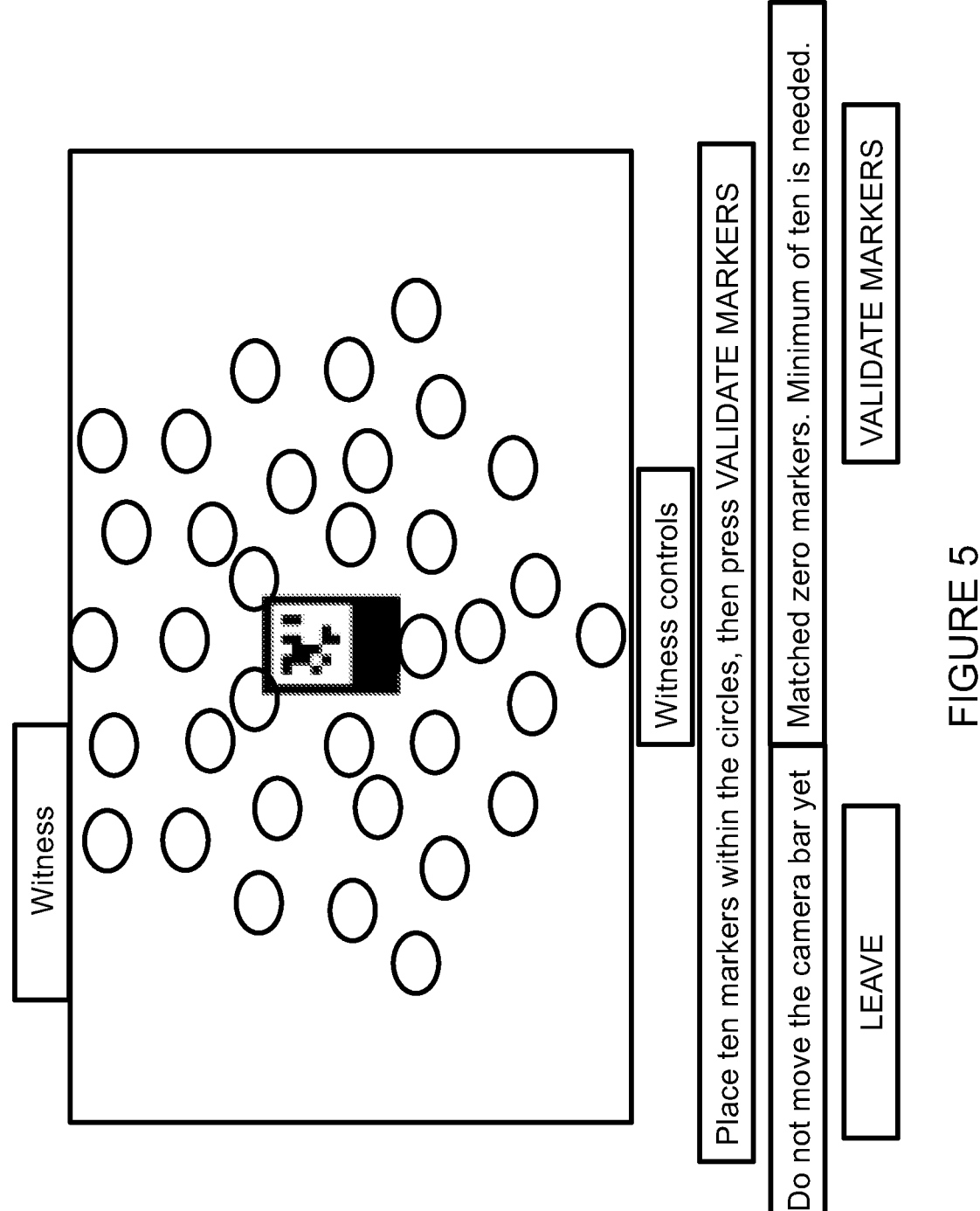
FIG. 5 shows an example user interface presented in a display of a computer system when a non-random quasicrystal pattern is first generated, where the camera bar is pointed at the elements of the non-random pattern and the display shows a live video stream including the elements of the non-random pattern. The elements of the non-random pattern are overlaid on top of the video stream to guide the user.

The user interface presented in a display of a computer system may look like the image in FIG. 5 when a non-random quasicrystal pattern is first generated, where the camera bar is pointed at the elements of the non-random pattern and the user views a live video stream including the elements of the non-random pattern. The elements of the non-random pattern (e.g. as red circles) are overlaid on top of the video stream to guide the user. (Note: the camera bar stereo cameras are referred to as "witness" cameras in the user interface (UI) of FIG. 5). In the example of FIG. 5, an initial marker is shown at the centre of the image.

Covering the Rest of the Tracking Space

Figure 4:
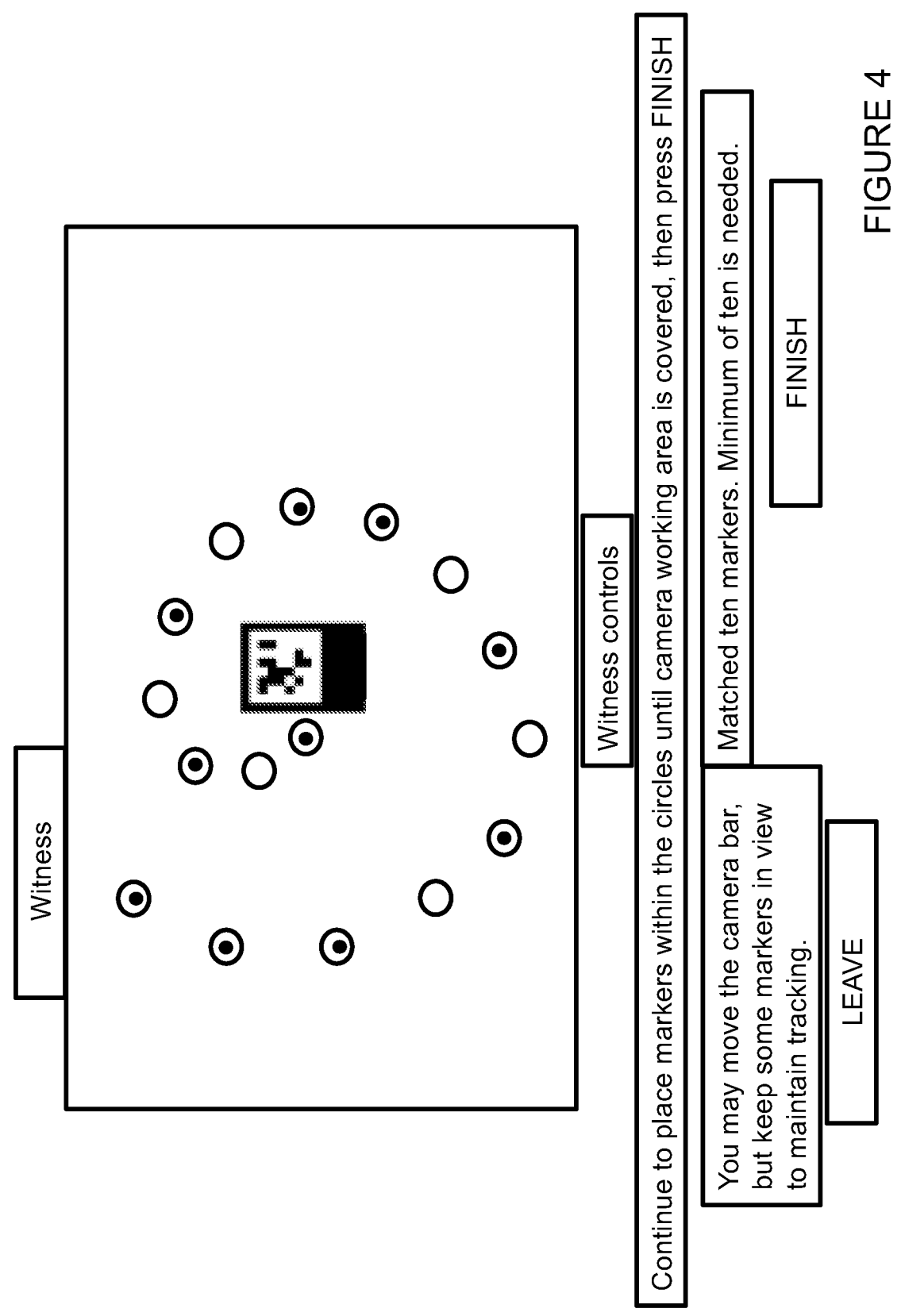
FIG. 4 shows an example user interface presented in a display of a computer system in which some Markers (black filled circles) have been placed in the non-random spiral pattern of FIG. 3.
Figure 6:
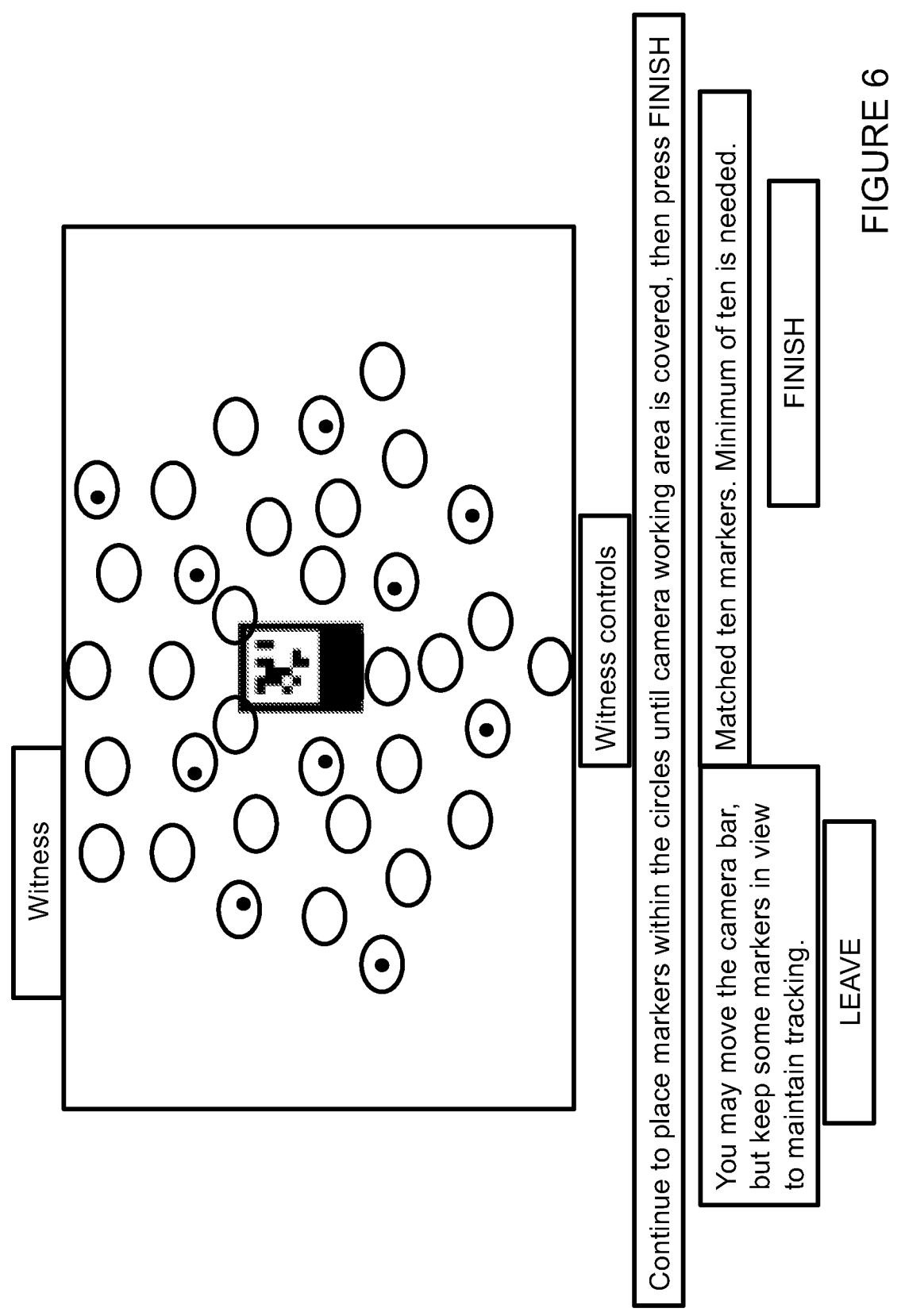
FIG. 6 shows an example user interface presented in a display of a computer system in which some Markers (black filled circles) have been placed in the non-random quasicrystal pattern of FIG. 5.

Once a certain number of Markers have been placed in the non-random pattern, we are able to track the movement of the camera bar, as long as some markers are still in view. In an example, the user interface notifies the user that the markers have been placed in the correct positions, and whether a minimum amount of markers has been achieved. An example in which some Markers (black filled circles) have been placed in the non-random spiral pattern is shown in FIG. 4. In the example of FIG. 4, an initial marker is shown at the centre of the image. An example in which some Markers (black filled circles) have been placed in the non-random quasicrystal pattern is shown in FIG. 6. In the example of FIG. 6, an initial marker is shown at the centre of the image. In an example, the elements of the pattern may change colour (e.g. turn from red to green) when a marker is detected within them.

Once camera bar pose tracking is functional, we can lock the pattern into the scene in 3D space. This allows the user to incrementally move the camera bar around their area of movement and receive guidance on placing additional Markers. Once the area of movement is sufficiently covered with Markers, the user can end the setup process and track camera bar pose confidently.

The following describes example algorithms used to extract robustly the pose of the camera bar when the camera bar views markers that have been setup onto the known 3D path e.g. that is C1 (smoothness factor), or onto the known 3D positions (e.g. quasicrystal lattice positions).

Camera Bar Pose Computation

The following example pseudo algorithms or methods differ depending on the number of cameras mounted on the Camera Bar.

Pseudo Algorithm or Method: 2 to n (a Plurality of) Cameras Case

This is an instantaneous tracking/relocalization algorithm that only requires a subset (e.g. more than 8) of the markers to be seen by the Camera Bar. It does not require any specific movement from the camera bar. It includes the steps of:

1. Detecting markers' 2D positions on the image using a marker extraction algorithm (e.g. blob extraction etc. . . . )
2. Computing 3D positions of the detected 2D marker positions, where the camera bar is fully calibrated (e.g. using its intrinsic (e.g. distance between its e.g. two cameras) and extrinsic (e.g. its tilt angle and azimuthal angle) parameters) using a Camera Bar coordinate system.
3. Matching the 3D constructed markers to the 3D path of the markers, where the 3D path in the world coordinate system is known, or to the 3D positions of the markers, where the 3D positions of the markers in the world coordinate system are known.
   a. Fitting the set of 3D points to the 3D path of the markers or to the 3D positions of the markers (e.g. using Iterative closest point (ICP) fitting or similar, or curve fitting or even a non-linear minimization technique such as a Levenberg-Marquardt algorithm (LMA or just LM), also known as the damped least-squares (DLS) method; or Gauss Newton (the Gauss-Newton algorithm is used to solve non-linear least squares problems) etc.) that is robust to noise. The solution is then modelled as a SE(3) of the Lie Group, representing camera bar pose (e.g. six degrees of freedom: position, orientation). Physically, SE(3) (the Special Euclidean Group in 3 dimensions) is the group of simultaneous rotations and translations for a vector. It is used in robotics and general kinematics. SE(3) moves vectors from one frame to another.
   b. Extract the pose for the Camera Bar in the World coordinate system from the fit.

Pseudo Algorithm or Method: Monocular Camera Bar Case

This technique requires a movement to be applied to the Camera Bar.

It is used to compute a relative 3D position of the markers from the camera bar position at the end of the movement, then the absolute pose of the camera bar using the 3D path of the markers that is fully known, or using the 3D positions of the markers that are fully known.

1. Detecting markers' 2D positions on the image using a marker extraction algorithm (e.g. blob extraction etc. . . . ) on consecutive frames and labelling markers through the sequence using nearest neighbour matching.
2. Extract essential matrix using Robust extractor (e.g. Random sample consensus, or RANSAC, an iterative method for estimating a mathematical model from a data set that contains outliers) using opencv library for example and extract rotation and translation (up to a scale) from the first frame of the sequence to the last frame.
3. Compute 3D position (up to a scale factor S) of detected 2D marker positions, as camera bar intrinsic parameters are fully calibrated (e.g. its focal length is calibrated).
4. 3D constructed scaled markers to 3D path matching, where the 3D path in a world coordinate system is known; or 3D constructed scaled markers to 3D marker positions matching, where the 3D marker positions in a world coordinate system are known.
   a. Fit the set of 3D points to the 3D path or to the 3D positions (e.g. using Iterative closest point (ICP) fitting or similar, or curve fitting or even a non-linear minimization technique such as a Levenberg-Marquardt algorithm (LMA or just LM), also known as the damped least-squares (DLS) method; or Gauss Newton (the Gauss-Newton algorithm is used to solve non-linear least squares problems) etc.) that is robust to noise. The scale factor is one more variable to the problem being solved by the minimization technique. The solution is then modelled as a SIM(3) of the Lie Group, representing similarities (seven degrees of freedom: scale, position, orientation). SIM(3) is the group of similarity transformations in 3D space, the semi-direct product SE(3)×R*. It has seven degrees of freedom: three for translation, three for rotation, and one for scale.
   b. Extract the pose for the Camera Bar in the World coordinate system from the fit.

Applications

A method for mixing or compositing computer generated 3D objects and a video feed from a video camera, to generate augmented reality video in real-time, in which:

(a) the body of the video camera can be moved in 3D and sensors, including an accelerometer and a gyro sensing over six degrees of freedom, in or attached directly or indirectly to the video camera provide real-time positioning data enabling the 3D position and 3D orientation of the video camera to be calculated;

(b) a camera bar, for example including two cameras forming a stereoscopic system, is fixed directly or indirectly to the video camera;

(c) that real-time positioning data is then automatically used to create, recall, render or modify computer generated 3D objects;

(d) the resulting computer generated 3D objects are then mixed in or composited with the video feed from the video camera in real-time to provide augmented reality video for example for TV broadcast, cinema or video games;

and in which:

(e) the 3D position and orientation of the video camera is determined with reference to a 3D map of the real-world, by using the real-time 3D positioning data from the sensors plus a video flow in which the camera bar, for example including two cameras forming a stereoscopic system, surveys a field of view, and software running on a processor is used to detect non-randomly positioned markers in the field of view, the markers and their non-random positions being previously recorded at the processor and included in the 3D map of the real-world, wherein the markers have been previously manually or artificially added to that field of view. The non-randomly positioned markers may be non-randomly positioned markers as described elsewhere in this document. The field of view of the camera bar may not coincide at all with the field of view of the video camera. The field of view of the camera bar may partially overlap with the field of view of the video camera. The field of view of the camera bar may include the whole of the field of view of the video camera.

A mixing or compositing system, the mixing or compositing system including:

(i) a video camera;

(ii) sensors including an accelerometer and a gyro sensing over six degrees of freedom;

(iii) a camera bar, for example including two cameras forming a stereoscopic system; and (iv) a processor;

for mixing or compositing computer generated 3D objects and a video feed from the video camera in real-time, to generate augmented reality video in real-time for example for TV broadcast, cinema or video games, in which:

(a) the body of the video camera can be moved in 3D and the sensors in or attached directly or indirectly to the video camera provide real-time positioning data enabling the 3D position and 3D orientation of the video camera to be calculated;

(b) the camera bar, for example including two cameras forming a stereoscopic system, is fixed directly or indirectly to the video camera;

(c) the system is configured to use that real-time positioning data automatically to create, recall, render or modify computer generated 3D objects;

(d) the system is configured to mix in or to composite the resulting computer generated 3D objects with the video feed from the video camera in real-time to provide augmented reality video in real-time for example for TV broadcast, cinema or video games;

and in which:

(e) the system is configured to determine the 3D position and orientation of the video camera with reference to a 3D map of the real-world, by using the real-time 3D positioning data from the sensors plus a video flow in which the camera bar, for example including two cameras forming a stereoscopic system, surveys a field of view, and in which software running on the processor is configured to detect non-randomly positioned markers in the field of view, the markers and their non-random positions being previously recorded at the processor and included in the 3D map of the real-world, wherein the markers have been previously manually or artificially added to that field of view. The non-randomly positioned markers may be non-randomly positioned markers as described elsewhere in this document. The field of view of the camera bar may not coincide at all with the field of view of the video camera. The field of view of the camera bar may partially overlap with the field of view of the video camera. The field of view of the camera bar may include the whole of the field of view of the video camera.

In an example, the accelerometer and the gyro sensing over six degrees of freedom are used to predict the video camera position to speed up and/or to make more robust the matching process between what the camera bar views and the 3D map of the real-world. An additional benefit of using the accelerometer and the gyro sensing over six degrees of freedom and the 3D map of the real-world is the possibility of frame interpolation between frames and/or frame extrapolation from one or more frames.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A method of setting up non-randomly positioned markers in a field of view of a camera bar, and tracking a pose of the camera bar, the method including the steps of:

(i) a camera bar viewing a field of view, the camera bar in fixed attachment with a video camera;

(ii) displaying the camera bar's view of the field of view on a display of a computer system;

(iii) the computer system generating a pattern of non-random marker positions, including positions in the field of view, and displaying the pattern of non-random marker positions in the field of view on the display of the computer system together with the camera bar's view of the field of view;

(iv) the computer system detecting in the view of the camera bar, that a marker has been placed in a position of a non-random marker position, generated in step (iii);

(v) the computer system recording a marker and a respective position of the marker in the field of view, in response to the computer system detecting in the view of the camera bar, that a marker has been placed in a position of a non-random marker position, in step (iv);

(vi) repeating steps (iv) and (v) until a predetermined number of different markers and respective marker positions have been recorded;

(vii) the computer system matching markers detected in the field of view of the camera bar with the recorded markers and their respective marker positions, to obtain a pose of the camera bar;

(viii) repeating step (vii), to track the pose of the camera bar.

2. The method of claim 1, including the step of storing the recorded predetermined number of different markers and respective marker positions.

3. The method of claim 1, wherein the generated pattern of non-random marker positions in the field of view starts from an initial indicator which is detected in the field of view by the computer system.

4. The method of claim 1, wherein the generated pattern of non-random marker positions in the field of view is generated using a path represented by a continuously differentiable (C1) continuous path or function.

5. The method of claim 4, wherein the markers positions are equidistantly spaced along the path.

6. The method of claim 1, wherein the generated pattern of non-random marker positions in the field of view is generated using a path represented by a smooth continuous path or function.

7. The method of claim 1, wherein the generated pattern of non-random marker positions in the field of view is generated from a set of parameters which are passed into one or more well-defined, deterministic formulas.

8. The method of claim 7, wherein a formula generates a spiral pattern and the parameters include the position of an initial marker, the camera bar height above the floor and the orientation angle(s) of the camera bar.

9. The method of claim 1, wherein the generated pattern of non-random marker positions in the field of view is a spiral pattern.

10. The method of claim 1, wherein the generated pattern of non-random marker positions in the field of view is a quasicrystal pattern.

11. The method of claim 1, wherein the generated pattern of non-random marker positions in the field of view is on a non-periodic grid, or on a periodic grid, or on a non-periodic lattice, or on a periodic lattice.

12. The method of claim 1, wherein the generated pattern of non-random marker positions in the field of view is on a set of non-intersecting closed curves, e.g. on a set of concentric circles.

13. The method of claim 1, wherein the generated pattern of non-random marker positions in the field of view is on a set of non-intersecting open curves, e.g. on a set of concentric semicircles.

14. The method of claim 1, wherein in step (iii), the pattern of non-random marker positions in the field of view are overlaid on the camera bar's view of the field of view.

15. The method of claim 1, wherein in step (iv), the computer system displays in the display that it has detected in the view of the camera bar that a marker has been placed in a position of a non-random marker position, e.g. by changing a displayed colour of the non-random marker position, e.g. from red to green.

16. The method of claim 1, wherein the camera bar is a monoscopic camera bar.

17. The method of claim 16, wherein step (vii) includes
(a) detecting markers' 2D positions in a sequence of images viewed by the camera bar using a marker extraction algorithm, where the first image and the last image of the sequence are taken from different camera bar positions, and labelling markers through the sequence using nearest neighbour matching;
(b) extracting matrices using a robust extractor to extract rotation and translation, in which a scale factor is unknown, from the first frame of the sequence to the last frame of the sequence;
(c) computing 3D marker positions, in which the scale factor is unknown, using the detected 2D marker positions, using camera bar calibration data;
(d1) matching the computed 3D marker scaled positions to a 3D path of the markers, where the 3D path in a world coordinate system is known, including fitting the set of computed 3D marker positions to the 3D path of the markers, including deriving the scale factor; or (d2) matching the computed 3D marker scaled positions to the 3D positions of the markers, where the 3D positions of the markers in a world coordinate system are known, including fitting the set of computed 3D marker positions to the 3D positions of the markers, including deriving the scale factor;
(e) modelling the matching solution as a SIM (3) of the Lie Group, to represent camera bar pose, the matching solution including a scale, and
(f) extracting the camera bar pose from the matching solution, in the world coordinate system.

18. The method of claim 17, wherein steps (d1) or (d2) are performed by using Iterative closest point (ICP) fitting, or curve fitting or using a non-linear minimization technique such as a Levenberg-Marquardt algorithm (LMA or just LM); or using a Gauss Newton algorithm.

19. The method of claim 17, wherein in step (b), Random sample consensus, RANSAC, is used.

20. The method of claim 1, wherein the Camera bar is a stereoscopic camera bar, including two cameras mounted a fixed distance apart in a stereoscopic configuration.

21. The method of claim 20, wherein step (vii) includes:
(a) detecting markers' 2D positions on images viewed by the camera bar using a marker extraction algorithm;
(b) computing 3D marker positions using the detected 2D marker positions, using camera bar calibration data, and using a camera bar coordinate system;
(c1) matching the computed 3D marker positions to a 3D path of the markers, where the 3D path in a world coordinate system is known, including fitting the set of computed 3D marker positions to the 3D path of the markers; or
(c2) matching the computed 3D marker positions to the 3D positions of the markers, where the 3D positions of the markers in a world coordinate system are known, including fitting the set of computed 3D marker positions to the 3D positions of the markers;
(d) modelling the matching solution as a SE (3) of the Lie Group, to represent camera bar pose, and
(e) extracting the camera bar pose from the matching solution, in the world coordinate system.

22. The method of claim 21, wherein steps (c1) or (c2) are performed by using Iterative closest point (ICP) fitting, or curve fitting or using a non-linear minimization technique such as a Levenberg-Marquardt algorithm (LMA or just LM); or using a Gauss Newton algorithm.

23. The method of claim 21, wherein the camera bar pose is provided instantaneously.

24. The method of claim 1, wherein the camera bar includes three cameras, arranged in a triangle (e.g. an equilateral triangle), at fixed distances from each other.

25. The method of claim 1, wherein the camera bar includes a plurality of cameras.

26. The method of claim 1, in which the field of view of the camera bar does not coincide at all with the field of view of the video camera.

27. The method of claim 1,
(a) in which the field of view of the camera bar partially overlaps with the field of view of the video camera; or
(b) in which the field of view of the camera bar includes the whole of the field of view of the video camera.

28. The method of claim 1,
(a) in which the markers have specific shapes, and/or colours and/or are made of specific materials; or
(b) in which the markers used do not differ from each other significantly in appearance; or (c) in which the markers used are approximately spherical, or approximately circular; or (d) in which the camera bar pose comprises camera bar rotation and camera bar translation i.e. six degrees of freedom; or (e) in which the computer system is a laptop computer, a desktop computer, a tablet computer, or a smartphone; or (f) in which the camera bar is moved to display a new field of view partly overlapping with a previous field of view, after the camera pose is tracked for the first time, and then the pattern of non-random marker positions in the new field of view is displayed on the display of the computer system together with the camera bar's view of the new field of view, and then steps iv) and (v) are performed; or (g) the method including repeating steps (iv) and (v), together with performing step (viii); or (h) the method including, when performing step (viii), the number of different markers and respective marker positions that have been recorded is at least ten, or is in the range of 10 to 1000, or is in the range of 20 to 500.

29. A system including a video camera, a camera bar in fixed attachment with the video camera, and a computer system including a display, wherein the computer system is configured to:

(i) display the camera bar's view of a field of view on the display of the computer system;

(ii) generate a pattern of non-random marker positions, including positions in the field of view, and display the pattern of non-random marker positions in the field of view on the display of the computer system together with the camera bar's view of the field of view;

(iii) detect in the view of the camera bar, that a marker has been placed in a position of a non-random marker position, generated in (ii);

(iv) record a marker and a respective position of the marker in the field of view, in response to detecting in the view of the camera bar, that a marker has been placed in a position of a non-random marker position, in (iii);

(v) repeat (iii) and (iv) until a predetermined number of different markers and respective marker positions have been recorded;

(vi) match markers detected in the field of view of the camera bar with the recorded markers and their respective marker positions, to obtain a pose of the camera bar;

(vii) repeat (vi), to track the pose of the camera bar.

30. A computer program product, the computer program product embodied on a non-transitory storage medium executable on a computer system including a display to:

(i) display a camera bar's view of a field of view on the display of the computer system;

(ii) generate a pattern of non-random marker positions, including positions in the field of view, and display the pattern of non-random marker positions in the field of view on the display of the computer system together with the camera bar's view of the field of view;

(iii) detect in the view of the camera bar, that a marker has been placed in a position of a non-random marker position, generated in (ii);

(iv) record a marker and a respective position of the marker in the field of view, in response to detecting in the view of the camera bar, that a marker has been placed in a position of a non-random marker position, in (iii);

(v) repeat (iii) and (iv) until a predetermined number of different markers and respective marker positions have been recorded;

(vi) match markers detected in the field of view of the camera bar with the recorded markers and their respective marker positions, to obtain a pose of the camera bar;

(vii) repeat (vi), to track the pose of the camera bar.

\* \* \* \* \*